United States Patent
Uchiyama

(10) Patent No.: US 6,590,487 B2
(45) Date of Patent: Jul. 8, 2003

(54) MOULDED COIL AND PRODUCTION METHOD THEREOF

(75) Inventor: Takahiro Uchiyama, Yokkaichi (JP)

(73) Assignee: Sumitomo Wiring Systems, Ltd., Mie (JP)

(*) Notice: Subject to any disclaimer, the term of this patent is extended or adjusted under 35 U.S.C. 154(b) by 15 days.

(21) Appl. No.: 09/901,102

(22) Filed: Jul. 10, 2001

(65) Prior Publication Data

US 2002/0005773 A1 Jan. 17, 2002

(30) Foreign Application Priority Data

Jul. 13, 2000 (JP) .................................. 2000-213030

(51) Int. Cl.[7] .............................................. H01F 27/02
(52) U.S. Cl. ........................ 336/90; 336/192; 336/198; 336/92; 336/96; 29/602.1
(58) Field of Search ................................. 336/192, 198, 336/208, 96, 90, 92; 29/605, 611, 602.1

(56) References Cited

U.S. PATENT DOCUMENTS 5,538,220 A * 7/1996 LaMarca ............... 251/129.15
6,127,912 A * 10/2000 Dust et al. ................. 336/208
6,310,533 B2 * 10/2001 Coulombier ................. 336/90
6,374,814 B1 * 4/2002 Cook et al. ............. 123/568.21

FOREIGN PATENT DOCUMENTS

EP 973 179 1/2000
JP 5-11410 2/1993

* cited by examiner

Primary Examiner—Anh Mai
(74) Attorney, Agent, or Firm—Banner & Witcoff, Ltd.

(57) ABSTRACT

The invention provides a moulded coil wherein a sheathing surrounding a coil has no joints.

A coil 13, while being supported by movable pins 37, is maintained in a suspended state with a cavity 35 formed between an upper mould 31 and a lower mould 32. From this state, molten plastic R is injected into the cavity 35. When the amount of molten plastic R that has been injected reaches 70–80% of a specified amount, the movable pins 37 move outwards until they have retreated to a position whereby they form a unified face with opposing faces of the cavity 35. At this juncture, the coil 13 remains in its original position even though it is no longer supported by the movable pins 35. After the movable pins 37 have retreated, the molten plastic R continues to be injected, and fills the area formerly occupied by the movable pins 37. A moulded coil 10 is obtained in which the coil 13 is entirely surrounded by the sheathing 14 which has no joints.

8 Claims, 5 Drawing Sheets

MOULDED COIL AND PRODUCTION METHOD THEREOF

TECHNICAL FIELD

The present invention relates to a moulded coil and a production method thereof.

BACKGROUND OF THE INVENTION

One example of this type of moulded coil is described in JP 5-11410. As shown in FIG. 10 of this specification a coil 5 thereof is formed by winding a copper coil wire 4 around a plastic bobbin 1 comprising a cylindrical body 2 which has flanges 3 positioned near both ends. A sheathing 6 is moulded around the coil 5 in the following way. A mould presses upper and lower ends of the cylindrical body 2 of the bobbin 1, thereby maintaining the coil 5 within a cavity of the mould. The cavity is filled with molten plastic, which hardens to form the sheathing 6.

The components moulded in the conventional manner have a joint 7 between the bobbin 1 and the sheathing 6. If the materials that constitute the bobbin 1 and the sheathing 6 do not match, there is the danger that the bobbin 1 and the sheathing 6 do not fit adequately and are not fitted tightly together, this causing a gap to form in the joint 7. In such a case, if, for example, the moulded coil is used in a manner whereby it is immersed in oil, this oil may enter through the gap, thereby damaging the coil wire 4, particularly if the oil contains sulphur.

The present invention has taken the above problem into consideration, and aims to improve on the conventional example.

SUMMARY OF THE INVENTION

According to the invention there is provided a method of encapsulating an electrical coil comprising a bobbin having a coil wire wound thereon, and from which electrical connections extend, the method comprising the steps of:

placing the coil in a mould cavity;

spacing the coil away from the wall of the cavity by means of movable supports, said supports occupying a predetermined volume of said cavity;

introducing molten plastic into the cavity;

moving said supports away from the coil after a predetermined percentage volume of said cavity is filled; and continuing injection of molten plastic so that said predetermined volume is filled and said coil is encapsulated, the electrical connections protruding from the coil encapsulation.

Such a method encapsulates the coil and prevents leakage through joints or junction faces.

Preferably the necessary electrical connections from the coil are encapsulated in a tongue to further reduce the possibility of leakage. Such a tongue increases the length of any possible leakage path.

The invention also provides an encapsulated electrical coil produced by the method of the invention.

In a preferred embodiment this coil includes a tongue to encapsulate the necessary electrical connections, and this tongue may define a plug adapted to receive a sheath for wires which are in use connected to said connections. The plug and sheath arrangement further improve resistance to leakage.

BRIEF DESCRIPTION OF DRAWINGS

Other features of the invention will be apparent from the following description of several preferred embodiments shown by way of example only in the accompanying drawings in which.

DESCRIPTION OF PREFERRED EMBODIMENTS

Embodiments of the present invention are described below with the aid of figures.

Figure 1:
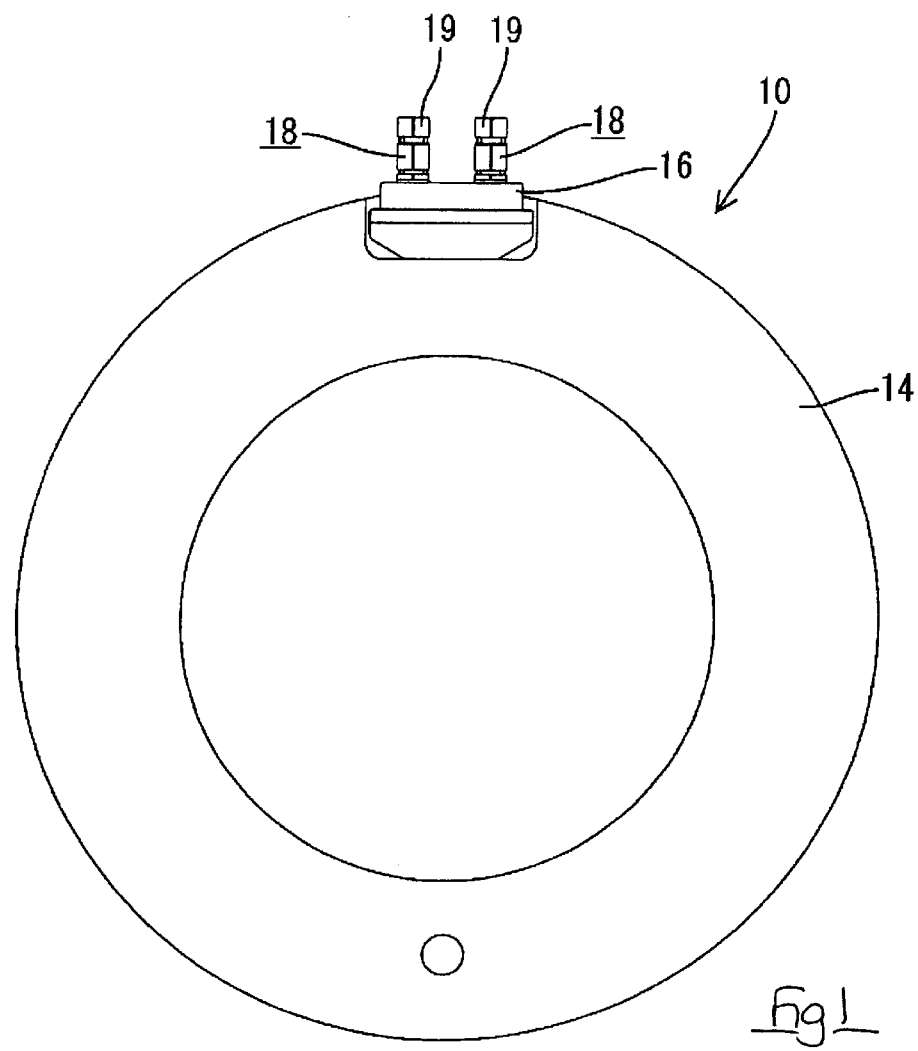
FIG. 1 is a front view showing a moulded coil of a first embodiment of the present invention.
Figure 2:
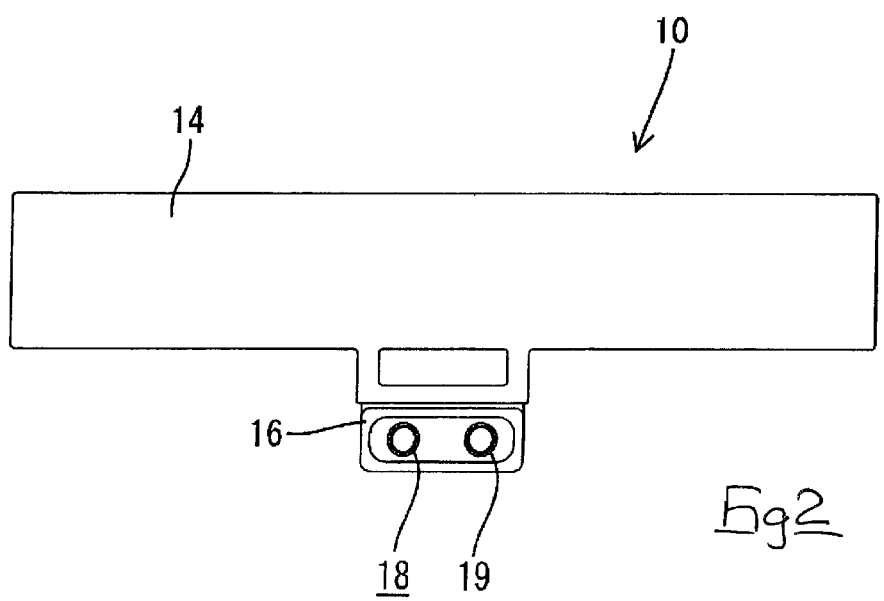
FIG. 2 is a plan view corresponding to FIG. 1.
Figure 3:
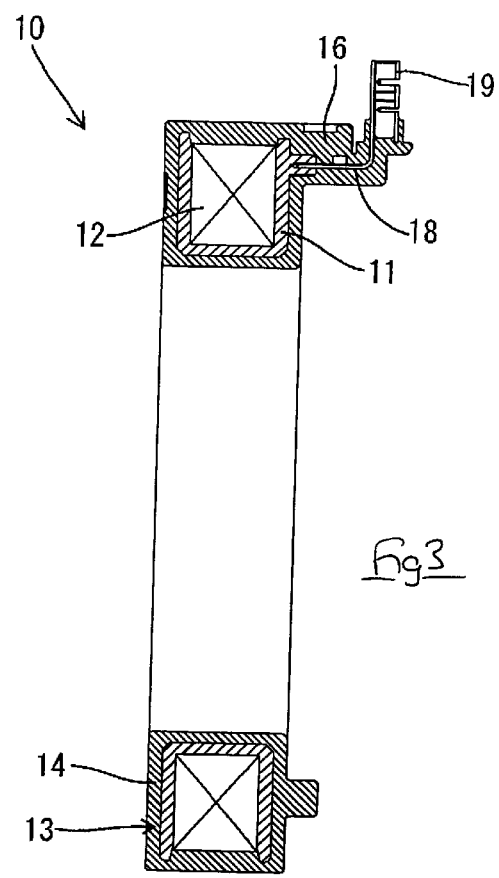
FIG. 3 is a cross-sectional view corresponding to FIG. 1.

A first embodiment of the present invention is described below with the aid of FIGS. 1 to 7. Moulded coils 10 of the present embodiment form one part of a solenoid. As shown in FIGS. 1 to 3, each moulded coil 10 is round in shape and has a coil 13 formed by winding a copper coil wire 12 around a plastic bobbin 11. A plastic sheathing 14 is moulded around the coil 13. An attaching member 16 protrudes outwards from a portion of an outer circumference portion of the sheathing 14, this attaching member 16 being formed in a unified manner therewith. A pair of attaching terminals 18 protrude from the attaching member 16. Each attaching terminal 18 is L-shaped, one end thereof being fixed to the bobbin 11 in a state whereby it makes contact with the coil wire 12. A barrel member 19 provided on the other end of each attaching terminal 18 protrudes from the vicinity of an upper face of each attaching member 6.

Figure 4:
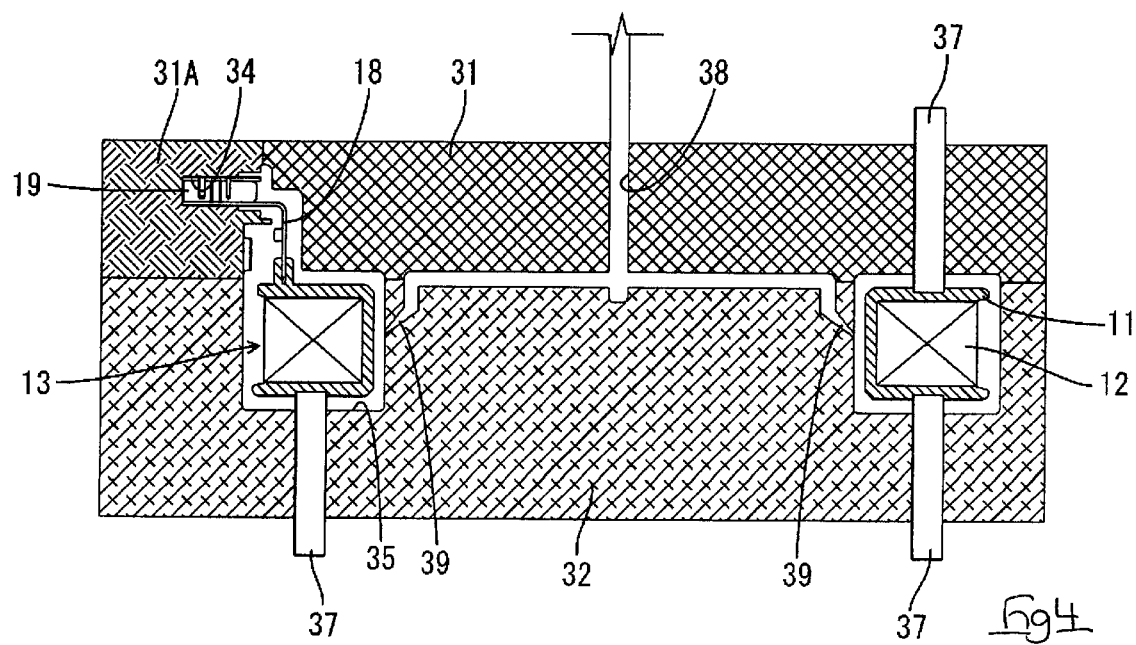
FIG. 4 is a cross-sectional view showing coils in a state whereby they have been set within a mould.

Next, the moulding of the sheathing 14 will be explained. As shown in FIG. 4, the present embodiment has an upper mould 31 and a lower mould 32. The upper mould 31 is provided with a separable mould 31A which has supporting holes 34. The barrel members 19 of the attaching terminals 18 protruding from the coil 13 can be inserted into these supporting holes 34. When the mould is closed, a cavity 35 is formed between the upper mould 31 (including the separable mould 31A) and the lower mould 32, the sheathing 14 and the attaching members 16 being moulded therein. A plurality of movable pins 37, which are capable of moving inwards and outwards, are separated from one another at specified angles in opposing faces of the cavity 35 in which the circular portion of each sheathing 14 is formed.

Figure 5:
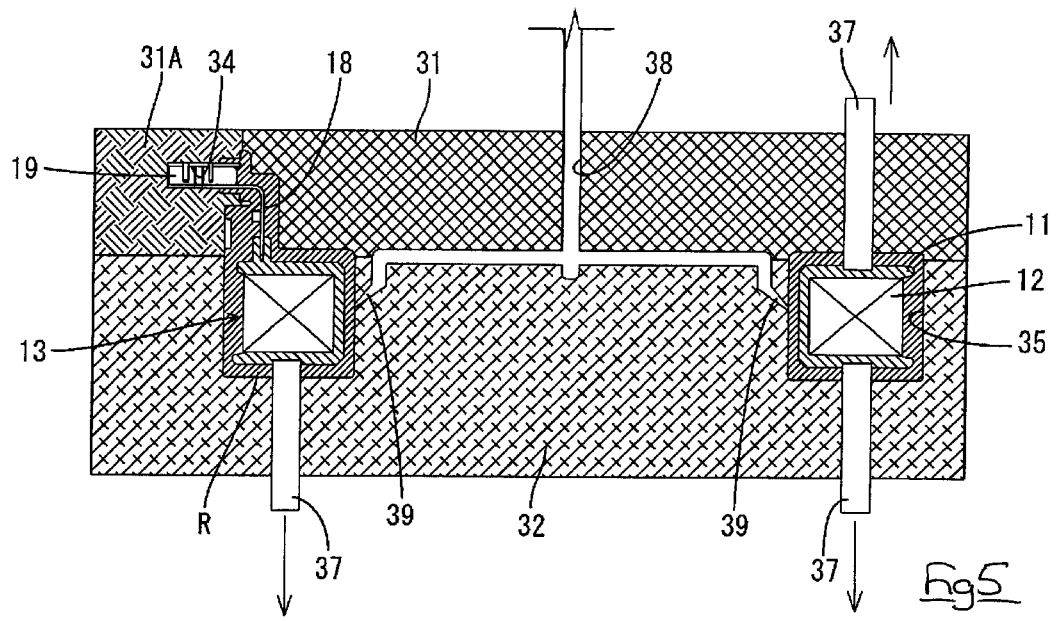
FIG. 5 is a cross-sectional view showing moulding in progress.

The moulding proceeds in the following sequence. First, as shown in FIG. 4, the mould is closed with the attaching terminals 18 in an inserted state within the supporting holes 34 of the separable mould 31A, and with the coils 13 housed within the cavities 35. At this juncture, the movable pins 37 are in an inwards position whereby they contact the coils 13 above and below, and maintain them within the cavities 35 in a suspended state. From this state, as shown in FIG. 5, molten plastic R is injected into the cavities 35 via a runner 38 and gates 39. When the amount of molten plastic R that has been injected reaches 70–80% of a specified amount, the movable pins 37 are moved outwards, as shown by the arrows in FIG. 5, until they have retreated to a position whereby they form a unified face with the opposing faces of the cavities 35 (see FIG. 6). After 70–80% of the molten plastic R has been injected into the cavities 35, the coils 13 remain in the position in which they were originally maintained even though they are no longer supported by the movable pins 35 and are receiving the force of the remaining plastic that is injected.

Figure 6:
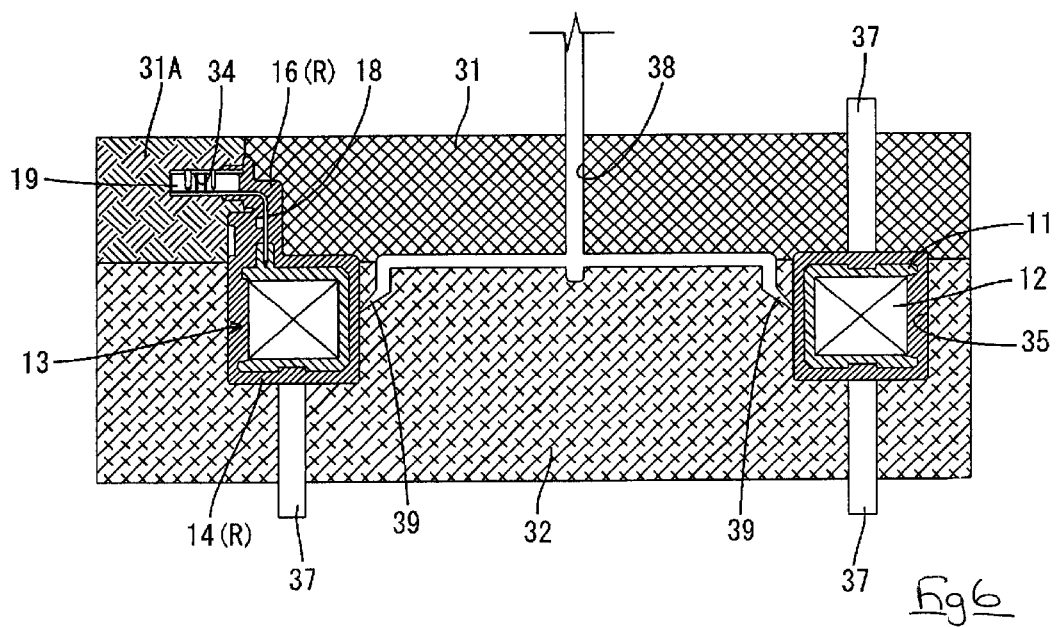
FIG. 6 is a cross-sectional view showing the completed moulding.

The movable pins 37 retreat during continuous injection of the molten plastic R, which fills the area formerly occupied by the movable pins 37 (see FIG. 6). Injection stops after the specified amount of the plastic R has been injected, and the mould is maintained in the closed state for a specified period of time. The plastic R hardens as it cools. After the specified time has elapsed, the mould is opened and the moulded parts removed, these being the moulded coils 10 in which the coils 13 are entirely surrounded by the sheathing 14 which has no joints formed therein (see FIGS. 1 to 3).

Figure 7:
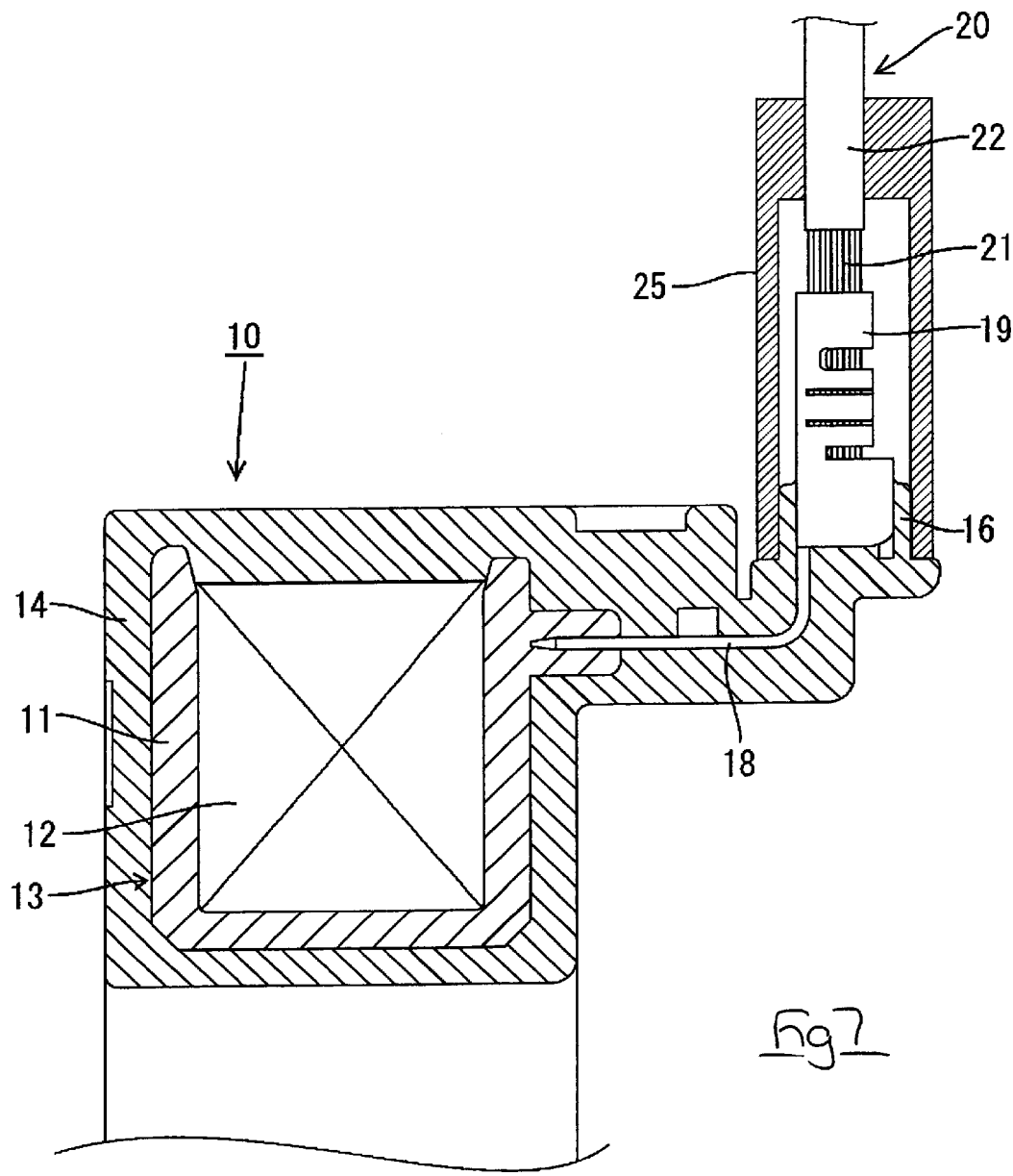
FIG. 7 is a partial cross-sectional view showing a lead wire in an attached state with an attaching terminal.

Furthermore, as shown in FIG. 7, core wires 21 of lead wires 20 are joined, by being crimped to the barrel members 19, to the attaching terminals 18 which protrude from the attaching member 16. A rubber covering member 25 covers the space between the attaching member 16 and an end of a cover 22 of each lead wire 20, thereby waterproofing the portions that protrude from the attaching terminals 18.

The moulded coil 10 of the present embodiment has a configuration whereby the coil 13 is entirely surrounded by the sheathing 14 which has no joints formed therein. Consequently, if the moulded coil 10 is used in a manner whereby it is immersed in oil, this oil will not enter therein.

Furthermore, the covering member 25 covers the portions protruding from the attaching terminals 18, thereby forming a seal. Consequently, oil is prevented from entering via the portions protruding from the attaching terminals 18.

Figure 8:
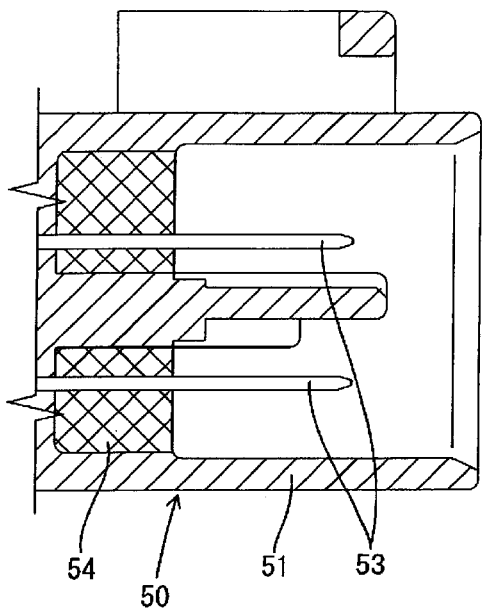
FIG. 8 is a cross-sectional view showing protruding portions of attaching terminals of a second embodiment.

Next, a second embodiment of the present invention, whereby protruding portions of attaching terminals have a different configuration, is described with the aid of FIG. 8.

In the second embodiment, an attaching member which is formed on a portion of the sheathing 14 is a male housing 50, provided with a hood 51. A pair of tab-shaped attaching terminals 53, which join with the coil wire 12, protrude from an inner face of the hood 51, and the interior side of this hood 51 is filled with a sealant 54 consisting of epoxy resin or the like.

That is, the portions protruding from the attaching terminals 53 have the shape of male waterproof connectors and are sealed. Consequently, liquid is prevented from entering via these portions.

Figure 9:
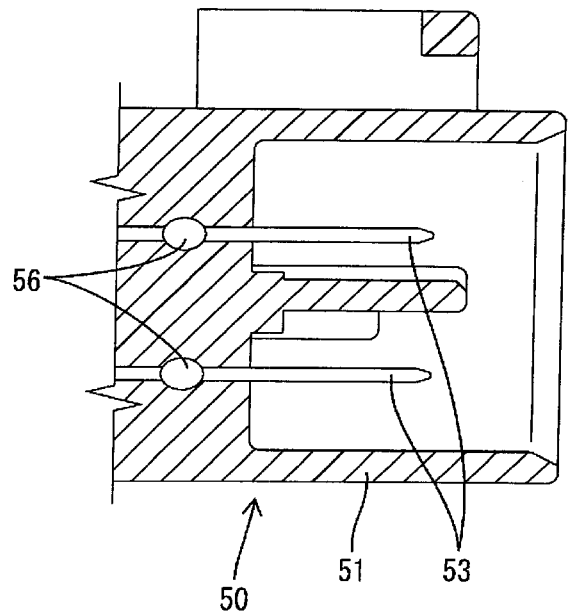
FIG. 9 is a cross-sectional view showing protruding portions of attaching terminals of a third embodiment.
Figure 10:
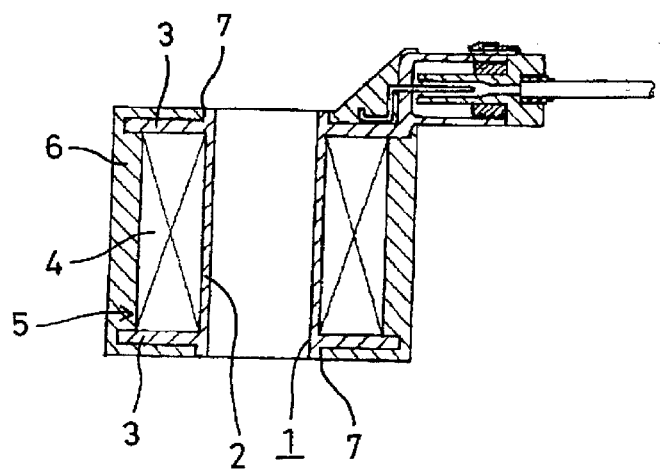
FIG. 10 is a cross-sectional view of a prior art.

A third embodiment of the present invention, whereby protruding portions of attaching terminals have another, different, configuration, is described with the aid of FIG. 9.

In the third embodiment, as in the second embodiment, an attaching member which is formed on a portion of the sheathing 14 is a male housing 50 provided with a hood 51. However, the male housing 50 is moulded together with a sheathing 14 in a state whereby an adhesive or sealant 56 has first been applied to the portions of the attaching terminals 53 which pass through the male housing 50.

As a result, the portions of the attaching terminals 53 which pass through the male housing 50 are sealed by the adhesive 56, thereby preventing liquid from entering.

The present invention is not limited to the embodiments described above with the aid of figures. The present invention may be embodied in various other ways without deviating from the scope of the claims appended hereto.

What is claimed is:

1. A method of encapsulating an electrical coil comprising a bobbin having a coil wire wound thereon, and from which electrical connections extend, the method comprising the steps of:

placing the coil in a mould cavity;

spacing the coil away from the wall of the cavity by means of movable supports, said supports occupying a predetermined volume of said cavity;

introducing molten plastic into the cavity;

moving said supports away from the coil after a predetermined percentage volume of said cavity is filled; and continuing injection of molten plastic so that said predetermined volume is filled and said coil is completely encapsulated, the electrical connections protruding from the coil encapsulation and the coil encapsulation being free of joints.

2. A method according to claim 1 wherein said predetermined percentage is more than 60%.

3. A method according to claim 2 wherein said predetermined percentage is in the range of 70–80%.

4. A method according to claim 1 wherein said supports are movable away from the coil to a position flush with the wall of said cavity.

5. A method according to claim 1 wherein said electrical connections comprise two conductors, said mould cavity includes a recess for the conductors, and said coil encapsulation extends as a tongue within which said conductors are embedded.

6. An encapsulated electrical coil having protruding electrical connections and produced by the method of:

placing the coil in a mould cavity;

spacing the coil away from the wall of the cavity by means of movable supports, said supports occupying a predetermined volume of said cavity;

introducing molten plastic into the cavity;

moving said supports away from the coil after a predetermined percentage volume of said cavity is filled; and continuing injection of molten plastic so that said predetermined volume is filled and said coil is completely encapsulated, the electrical connections protruding from the coil encapsulation and the coil encapsulation being free of joints.

7. A coil according to claim 6 wherein said electrical connections comprise two electrical conductors, and said encapsulation includes a tongue within which said electrical conductors are embedded, said tongue extending to electrical terminals of said conductors.

8. A coil according to claim 7 wherein said tongue defines a plug at the end thereof, said plug being adapted for engagement with a sheath for wires connected to said conductors in use.

* * * * *